(12) United States Patent
Sasaki

(10) Patent No.: US 6,556,568 B2
(45) Date of Patent: *Apr. 29, 2003

(54) CELL FLUCTUATION ABSORPTION RECEIVING SYSTEM

(75) Inventor: Toshimitsu Sasaki, Koriyama (JP)

(73) Assignee: Hitachi Communication Technologies, Ltd., Koriyama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,897

(22) Filed: Apr. 7, 1998

(65) Prior Publication Data

US 2002/0089987 A1 Jul. 11, 2002

(51) Int. Cl.$^7$ .......................... H04L 12/56; H04L 12/02
(52) U.S. Cl. ................. 370/395.1; 370/389; 370/391; 370/399; 370/412; 370/474; 370/905; 709/233; 709/234
(58) Field of Search .................. 370/298, 299, 370/300, 301, 391, 395, 399, 412, 474, 905, 389, 395.1; 709/233, 234

(56) References Cited

U.S. PATENT DOCUMENTS

| 5,412,655 | A | * | 5/1995 | Yamada et al. ............. 370/60.1 |
| 5,521,915 | A | * | 5/1996 | Dieudonne et al. ......... 370/60.1 |
| 5,541,926 | A | * | 7/1996 | Saito et al. ................. 370/94.2 |
| 5,734,653 | A | * | 3/1998 | Hiraiwa et al. ............. 370/395 |
| 5,740,173 | A | * | 4/1998 | Fiorini ........................ 370/394 |
| 6,021,134 | A | * | 2/2000 | Hiraiwa et al. ............. 370/474 |

* cited by examiner

Primary Examiner—Hassan Kizou
Assistant Examiner—Joe Logsdon
(74) Attorney, Agent, or Firm—Antonelli, Terry, Stout & Kraus, LLP

(57) ABSTRACT

A receiving method for absorbing cell-fluctuation with a minimum data delay in low-speed transmission in an ATM switching network. In a cell fluctuation absorption receiving method of a CLAD device equipped in an ATM switching network, the CLAD device for assembling or disassembling cells from or to a bit string having a fixed communication speed of data communication from the connected communication device includes a CLAD unit having a receiving buffer corresponding to the communication speed of each of the addresses, and before storing the first received cell data, storing dummy data in a receiving buffer, the dummy data corresponding to the fluctuation guarantee time.

2 Claims, 8 Drawing Sheets

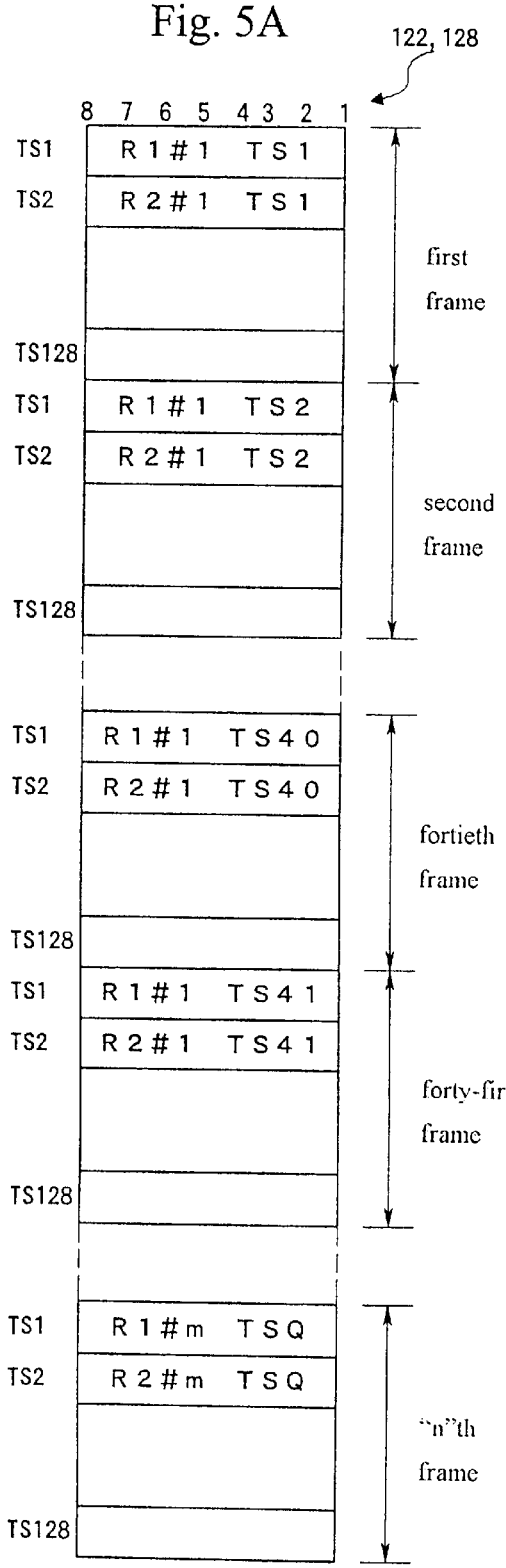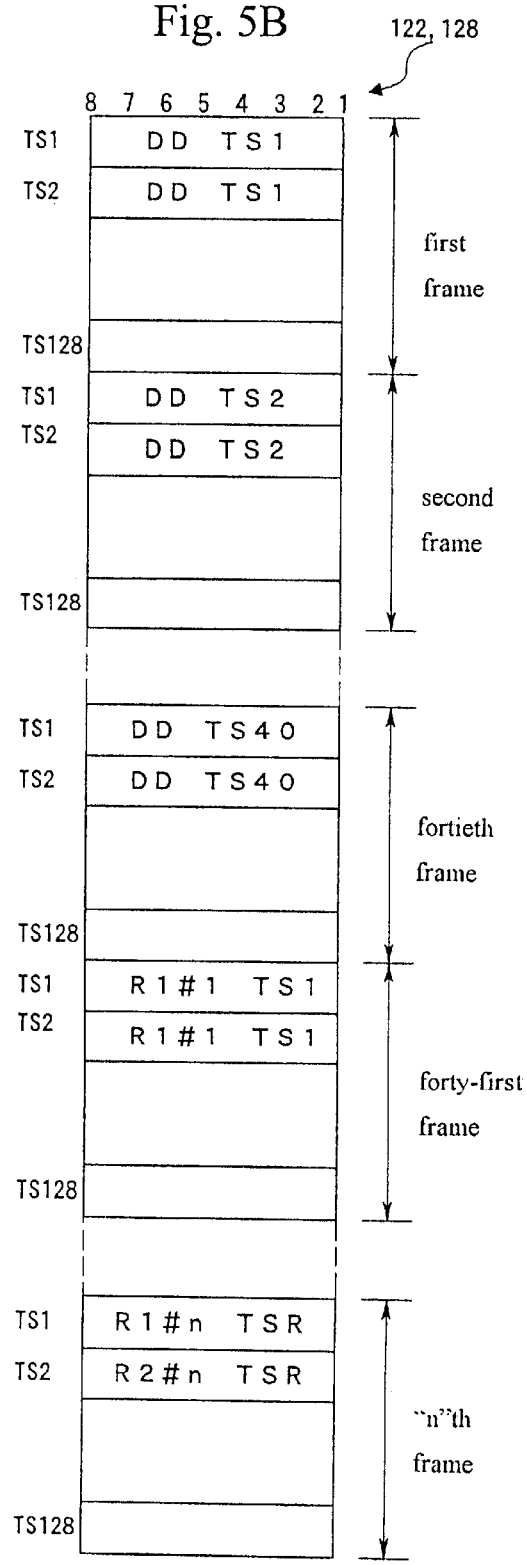

CELL FLUCTUATION ABSORPTION RECEIVING SYSTEM

BACKGROUND OF THE INVENTION

The present invention relates to a cell assembly and disassembly (CLAD) device for transferring data having a predetermined communication speed, such as in a voice communication compressed to 8Kbps, and especially relates to a receiving system absorbing cell fluctuation in a CLAD device included in an asynchronous transfer mode (ATM) switching network utilizing cells in a multimedia communication.

As is shown in FIG. 9, an ATM switching network is constituted by connecting a plurality of private branch exchange devices (PBX) 30 serving telephones 40 in an opposed manner to an ATM switch (ATM-SW) 20 of an ATM switching network through a cell assembly and disassembly (ATM-CLAD) device 10.

The ATM-CLAD device 10 is a device for transmitting a bit string of digital data having a predetermined communication speed, such as the voice communication from the PBX 30, to an ATM switching network by providing a header, and disassembling the data into cells, or receiving cells from the ATM switching network, removing the header, and reassembling a bit string of digital data and sending it out to the PBX 30.

The voice data from the telephone device 40a is converted to a digital data bit string at the PBX 30a and then transferred to the ATM-CLAD device 10a. At the ATM-CLAD device 10a, the digital data bit string is divided at every 48 bytes, provided with a header, assembled into a cell of 53 bytes, and transmitted to the opposing ATM-CLAD device 10b through an ATM switch (ATM-SW) 20.

At the opposing ATM-CLAD device 10b, the received cells are disassembled into a digital data bit string, which is transferred to the PBX 30. The digital data bit string is converted at the PBX 30b to a voice data, and is transmitted to a telephone device 40b.

In an ATM switching network where cells are transmitted by a fixed speed, a fluctuation may occur at the CLAD device when receiving the cells, according to the condition of the transmission path status and the like.

In the prior art ATM switching network, a cell receiving buffer was mounted to the ATM-CLAD device corresponding to the communication speed of the communication opponent, and the received cells were stored in a receiving buffer corresponding to the fluctuation guarantee time, and by sending out the data at a fixed communication speed, the cell fluctuation occurring when transferring data was absorbed.

According to such system, the stored data is sent out when the next cell is received, so it was necessary to receive at least two cells. That is, when sending out received data, a data send-out delay occurs corresponding to the time necessary to receive two cells. The delay of two cells would be approximately 6msec in voice data of 64Kbps, which will be no problem. However, when the voice was compressed by 8 Kbps, a delay of 48 msec occurs, which causes a decline in quality.

Further, in the prior art, communication was started against the communication device after receiving a cell corresponding to the fluctuation guarantee time at the start of communication. However, in a voice communication, the gap of time from receiving the first cell to receiving the second cell was too large when voice is compressed, so fluctuation could be absorbed, but delay of data also occurred. As was explained, in a low speed cell communication, storage by cell units could not be performed.

SUMMARY OF THE INVENTION

The present invention aims at providing a receiving system for absorbing a receiving fluctuation of a cell and minimizing data delay in a low speed transmission by a compression technique and the like in an ATM switching network.

In order to solve the above problem, the present invention provides a system characterized in that when a first cell is received at a start of a communication by the receiving buffer mounted to an ATM-CLAD device equipped in an ATM switching network, dummy data corresponding to a fluctuation guarantee time is stored in the receiving buffer before storing the received data continuously.

Further, the present invention provides a system in an ATM-CLAD device equipped with a buffer corresponding to the communication speed of each of the addresses when disassembling the cells for storing the bit string having a fixed communication speed of a data communication from a connecting communication device, and by a means for storing dummy data in the buffer corresponding to the fluctuation guarantee time before storing the first received cell data, absorbing the fluctuation reception of the cell, and by restoring the cells to a data bit string having a fixed communication speed against the connecting communication device, absorbs the cell fluctuation.

Further, the present invention comprises a control circuit for monitoring the address of the present output to the transmitting data buffer to the connecting communication device at the time of starting the communication or receiving the first cell, and by storing data from the address which is positioned after the fluctuation guarantee time, enabling to start the communication without waiting for the second cell. This leads to the minimization of data delay, and the guarantee of the fluctuation.

According to the present invention, dummy data corresponding to the fluctuation guarantee time is stored in the receiving buffer at the time of receiving the first cell at the start of the communication, so even if fluctuation occurs in the cells received thereafter, delay could be prevented by the existence of this dummy data.

By such characters, even if fluctuation occurs to the received cell, the data corresponding to the dummy data path could be outputted, maintaining the continuity of the data.

Further, according to the present invention, by increasing and decreasing the amount of dummy data, the fluctuation guarantee time and the delay time could be adjusted easily.

BRIEF DESCRIPTION OF THE DRAWINGS

FIGS. 5A and 5B are explanatory views showing the structure of the transmitting data buffer and the receiving data buffer and the write-in of the data;

PREFERRED EMBODIMENT OF THE INVENTION

Figure 1:
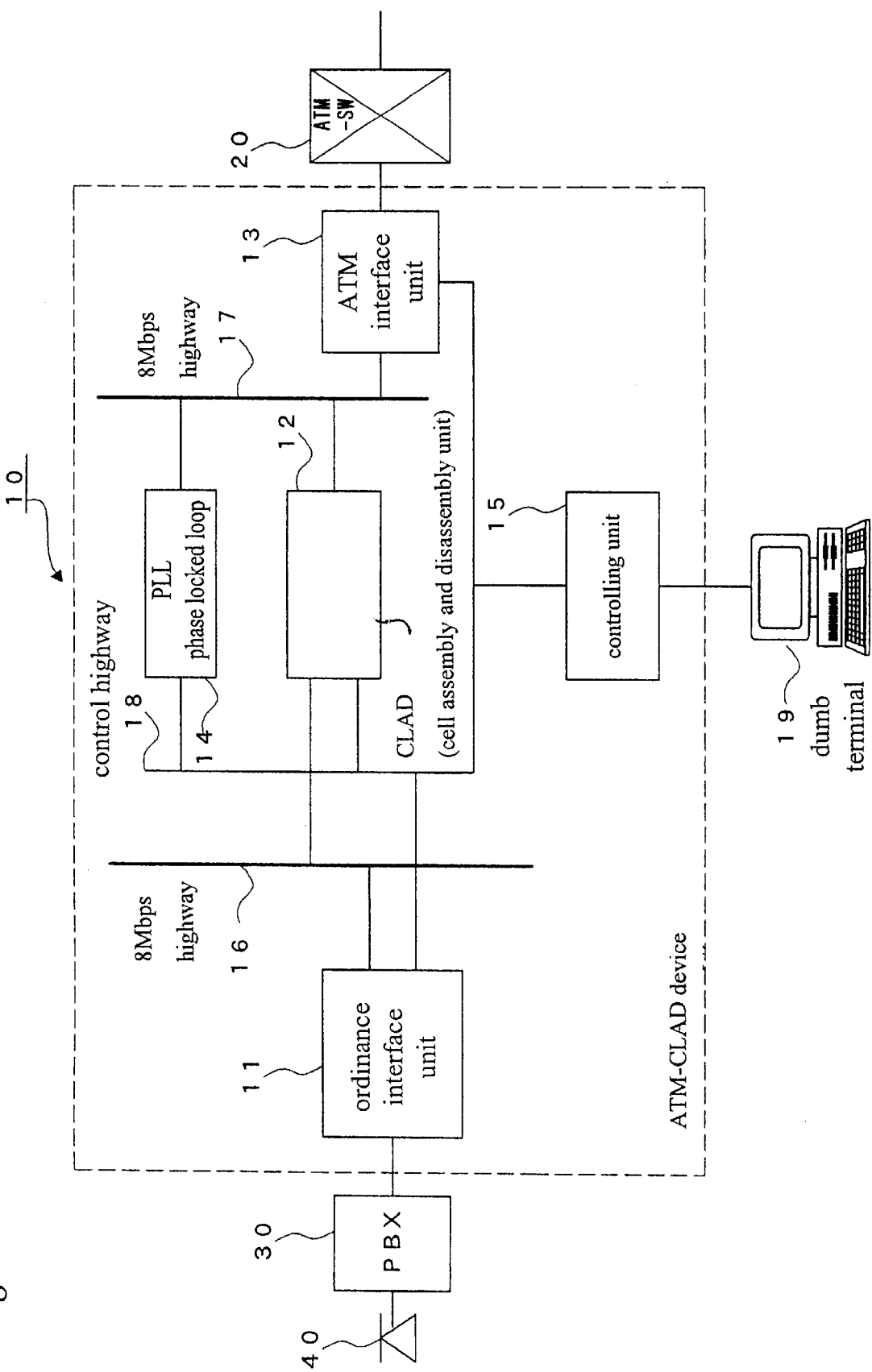
FIG. 1 is a block diagram explaining the hardware structure of the ATM-CLAD device 10 according to the embodiment of the present invention.

FIG. 1 is utilized to explain the block structure of the hardware of ATM-CLAD device 10 according to the present invention.

The ATM-CLAD device 10 comprises an ordinance interface (ordinance I/F) unit 11, a cell assembly and disassembly (CLAD) unit 12, and ATM interface (ATM I/F) unit 13, a phase locked loop (PLL) unit 14, and a control unit 15, which are connected to each other by a first 8 Mbps highway 16, a second 8 Mbps highway 17 and a control highway 18.

The ATM-CLAD device 10 is connected to an interface of a PBX 30 through the ordinance I/F unit 11, and to an interface of an ATM switch 20 through the ATM-I/F unit 13, and further connected to a dumb terminal 19.

The ordinance I/F unit 11 receives a digital data string from the interface of the PBX 30, and transfers the same to the CLAD unit 12 by way of the first 8 Mbps highway 16. On the other hand, said unit receives a digital data string from the CLAD unit 12 by way of the first 8 Mbps highway, and transmits the same to the PBX 30.

The CLAD unit 12 divides the digital data string from the ordinance I/F unit 11 at every 48 bytes and provides a 5 byte header, assembling a cell. Then, the cell is transferred to the ATM-I/F unit 13 by way of the second 8Mbps highway 17.

Further, the CLAD unit 12 disassembles the cell received from the ATM-I/F UNIT 13 by way of the second 8Mbps highway 17, converts the same to a digital data string, and then transfers the data string to the ordinance I/F unit 11 by way of the first 8Mbps highway 16.

The ATM-I/F UNIT 13 receives the cell from the CLAD unit 12 via the second 8 Mbps highway 17, and transfers the same to the ATM-SW 20. On the other hand, said unit receives the cell from the ATM-SW 20, and transfers the same to the CLAD unit 12 by way of the second 8 Mbps highway 17.

The PLL unit 14 generates a frame signal and a clock for the first 8 Mbps highway 16 and the second 8 Mbps highway 17, and provides the same to the ordinance I/F unit 11, the CLAD unit 12, and the ATM-IF unit 13 by way of the control bus 18.

The control unit 15 receives the structural information from the dumb terminal, and transfers the structural information to the ordinance I/F unit 11, the clad unit 12, the ATM-I/F unit 13, and the PLL unit 14 by way of the control bus 18.

Figure 2:
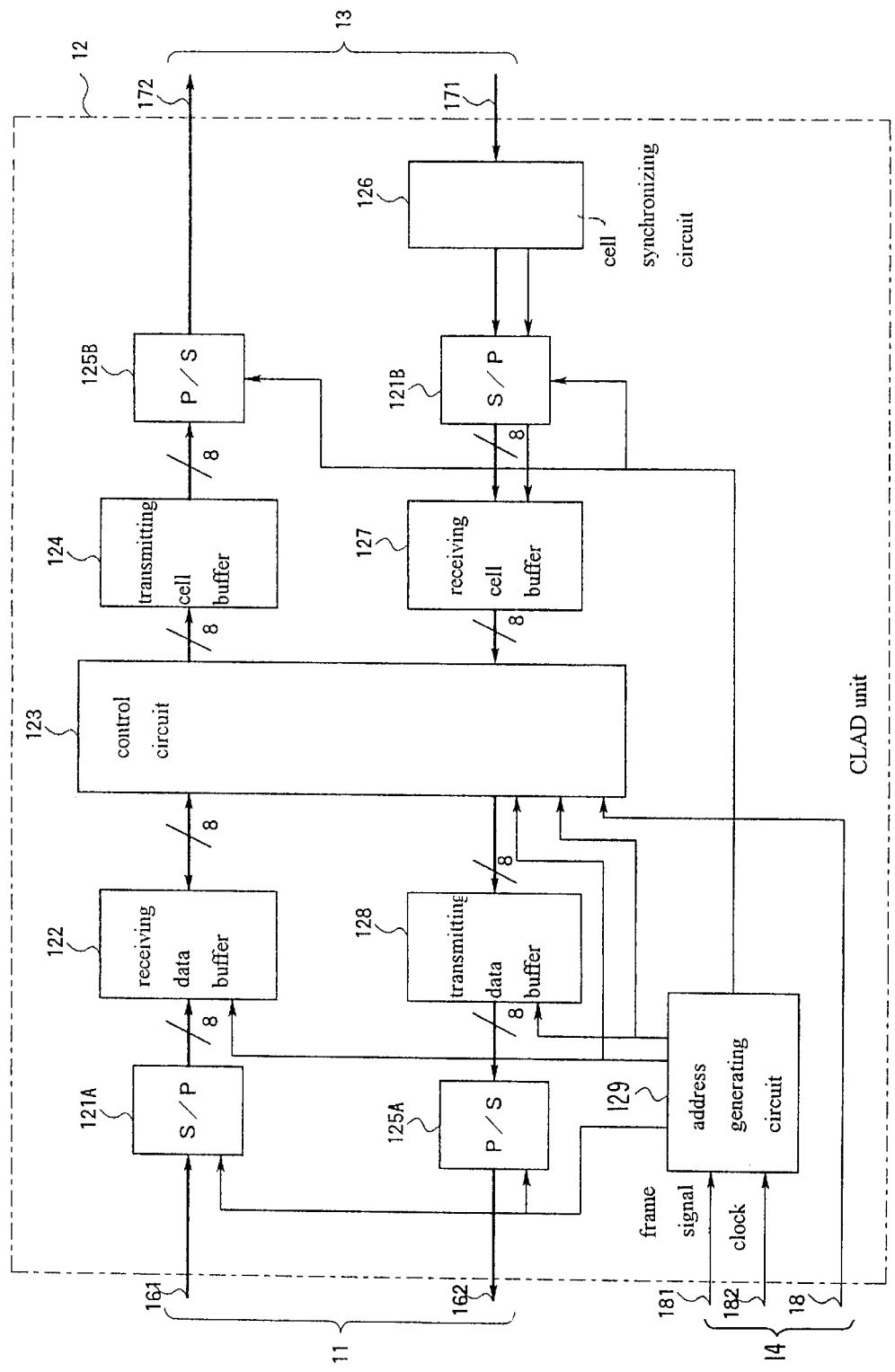
FIG. 2 is a function block diagram explaining the structure of the CLAD unit of the ATM-CLAD device 10 according to the embodiment of the present invention.

FIG. 2 is used to explain the structure and the function of the cell assembly and disassembly (CLAD) unit 12 mounted inside the ATM-CLAD device 10.

The CLAD unit 12 comprises of an ordinance I/F side serial/parallel (S/P) converting circuit 121A, an ATM-SW side serial/parallel (S/P) converting circuit 121B, a receiving data buffer 122 for storing the data temporarily, a transmitting data buffer 128, a control circuit 123, a transmitting cell buffer 124 for storing the cell temporarily, a receiving cell buffer 127, an ordinance I/F side parallel/serial (P/S) converting circuit 125A for converting an 8 bit parallel data into a serial data, an ATM-SW side parallel/serial (P/S) converting circuit 125B, a cell synchronizing circuit 126 for detecting a cell header from a header error controller (HEC), and an address generating circuit 129.

First, the operation of the CLAD unit 12 when assembling the serial data into a cell which was received by way of the first 8 Mbps highway 16, and sending the same out to the second 8 Mbps highway 17 is explained.

The digital data of 8.192 Kbps is received at the ordinance I/F side S/P converting circuit 121A from the first 8 Mbps highway 16 by way of a receiving data line 161. The ordinance I/F side S/P converting circuit 121A converts the received serial data into a 8 bit parallel data and transfers the parallel data to the receiving data buffer 122.

The address generating circuit 129 receives the frame signal 181 and the clock 182 from the PLL unit 14, senses the time slot position, and generates an address of the data buffer corresponding to the time slot position. Further, this address generation at the address generating circuit 129 is performed so that the receiving data buffer 122 becomes a ring buffer storing data corresponding to N frames.

Figure 3:
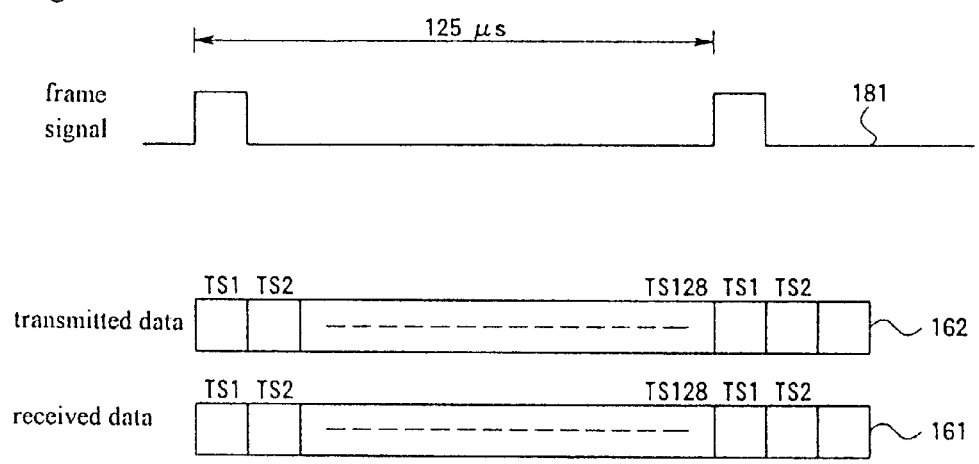
FIG. 3 is a timing view explaining the positional relations between the frame signal of the 8 Mbps highway inside the ATM-CLAD device 10, the transmission data and the slot of the received data.
Figure 4:
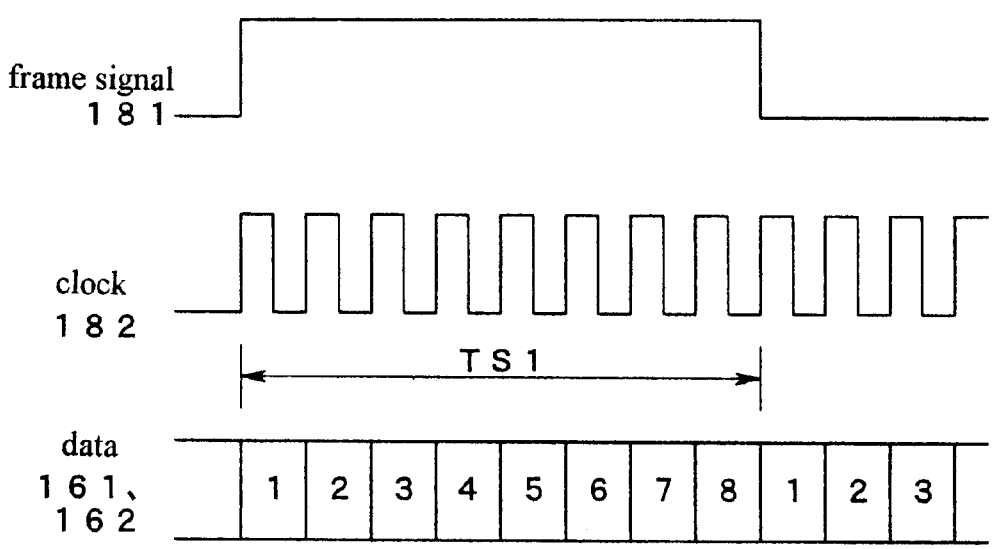
FIG. 4 is a timing view explaining timing relations between the frame signal of the 8 Mbps highway inside the ATM-CLAD device 10, the clock and the data.

Here, the structure of the time slot (TS) and the timing relations of the frame signal 181, the clock 182, the received data 161 and the transmitted data 162 on the first 8 Mbps highway 16 are explained in FIG. 3 and FIG. 4.

FIG. 3 shows the positional relations of the time slot between the received data 161 or the transmitted data 162 and one frame on the first 8 Mbps highway 16. FIG. 4 shows the timing relations between the frame signal 181, the clock 182, the received data 161 and the transmitted data 162 on the first 8 Mbps highway 16.

The received data 161 and the transmitted data 162 on the first 8Mbps highway 16 comprise a time slot (TS) of TS1 to TS128, and form a frame having a length of 125 $\mu$sec. Each time slot comprises 8 bits.

Equipped on the first time slot TS1 of the frame is an 8 bit frame signal 181 showing the start of the frame.

Hereinafter, the structure of the receiving data buffer 122 or the transmitting data buffer 128, and the reading or writing method of the data is explained using FIG. 5 (A).

The receiving data buffer 122 or the transmitting data buffer 128 is formed so that a frame comprised of 8 bit parallel data in time slots TS1 to TS128 could be written in corresponding to n frame portions.

The time slot of the buffer where the data is written is set corresponding to the transferring portion (route) of the data.

These data buffers are formed as a buffer where data could be written into the position designated by the address from the address generating circuit 129, or could be read out from the position designated by the address from the address generating circuit 129.

For example, when the ATM cell whose transfer area is R1 corresponds to the time slot TS1 of the buffer, the control circuit 123 writes the data of the ATM cell #1 of R1 into the time slot TS1 from the first frame to the fifty-third frame, and the data of the ATM cell #2 of R1 is written in to the time slot TS1 of the fifty-fourth frame to the one-hundred-sixth frame to the transmitting data buffer 128 where n frames could be written, according to the address signal from the address generating circuit. By these steps, when the ATM cell data whose transfer location is R1 is written into the time slot TS1 of the number "n" frame, it will be returned to the first frame, and repeatedly, from the first frame to the number "n" frame by the 8 bit of the time slot TS1, data is rewritten sequentially.

Similarly, when the ATM cell whose transfer area is R2 corresponds to the time slot TS2 of the buffer, the control circuit 123 writes into the transmitting data buffer, according to the address signal of the address generating circuit, the data of the ATM cell #1 of R2 from the time slot TS2 of the first frame to the fifty-third frame, and writes in the data of the ATM cell #2 of R2 from the fifty-fourth frame to the one-hundred-sixty frame of the time slot TS2. As was explained, when the ATM cell data whose transfer area is R2 has data written into the number "n" frame of the time slot TS2, it is returned to the first frame, and data is rewritten again from the first frame to the number "n" frame of the time slot TS2 sequentially.

As was explained above, the control circuit 123 writes data into different time slots TS for each of the addresses of the ATM cell.

That is, the parallelly changed received data is written into the time slot TS1 from the first frame to the fifty-third frame of its data whose address is R1 of the first octet to the fifty-third octet from the first ATM cell #1, and the data of the first octet to the fifty-third octet from the second ATM cell #2 is written into the time slot TS1 of the fifty-fourth frame to the one-hundred-sixth frame. Thereafter, the data transmitted by the ATM cell from the third and the following ATM cells are sequentially written into the receiving data buffer 122, and when the time slot TS1 to the number "n" is finished writing, then new data is written in the time slot TS1 of the first frame. By such operation, the ring buffer is structured.

The control circuit 123 receives the structural information corresponding to a time slot number from the control highway 18, the virtual path identifier (VPI) for setting to the cell header, and a virtual channel identifier (VCI) showing the address designating the sending location, and according to said structural information reads out the data from the time slot of the corresponding sending location of the receiving data buffer 122, and assembles the cell. That is, the circuit reads out the data written into the time slot TS1 from the first frame to the fifty-third frame, assembles the first ATM cell #1 of the sending area R1, and reads out the data written into the time slot TS1 from the fifty-fourth frame to the one-hundred-sixth frame, and assembles the second ATM cell #2. Then, similarly, the circuit reads out the data from the receiving buffer 122, and assembles the third and the following ATM cells.

The ATM cells having a different sending location are set, for example, to be written into a time slot TS2, and ATM cell data is written similarly as above.

Figure 6:
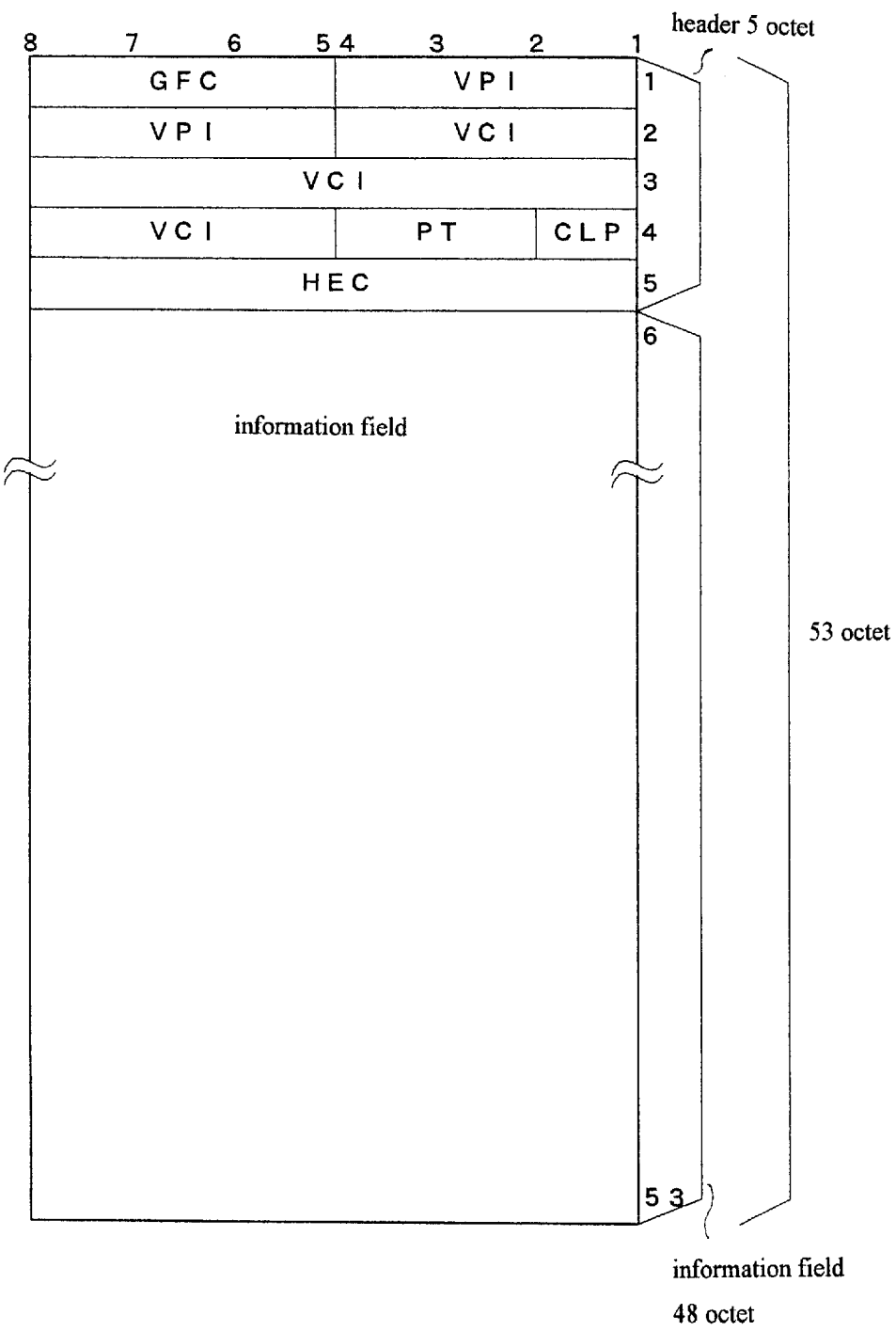
FIG. 6 is an explanatory view showing the structure of the ATM cell.

The structure of the ATM cell is explained using FIG. 6. As is shown in FIG. 6, the ATM cell is comprised of 53 octets, including a 5 octet ATM cell header and a 48 octet information field.

The ATM cell header comprises of a four bit general flow control (GFC), an eight bit virtual path identifier (VPI), a sixteen bit virtual channel identifier (VCI), a three bit pay load type (PT), a one bit cell loss priority indication (CLP), and an eight bit header error control (HEC).

Figure 7:
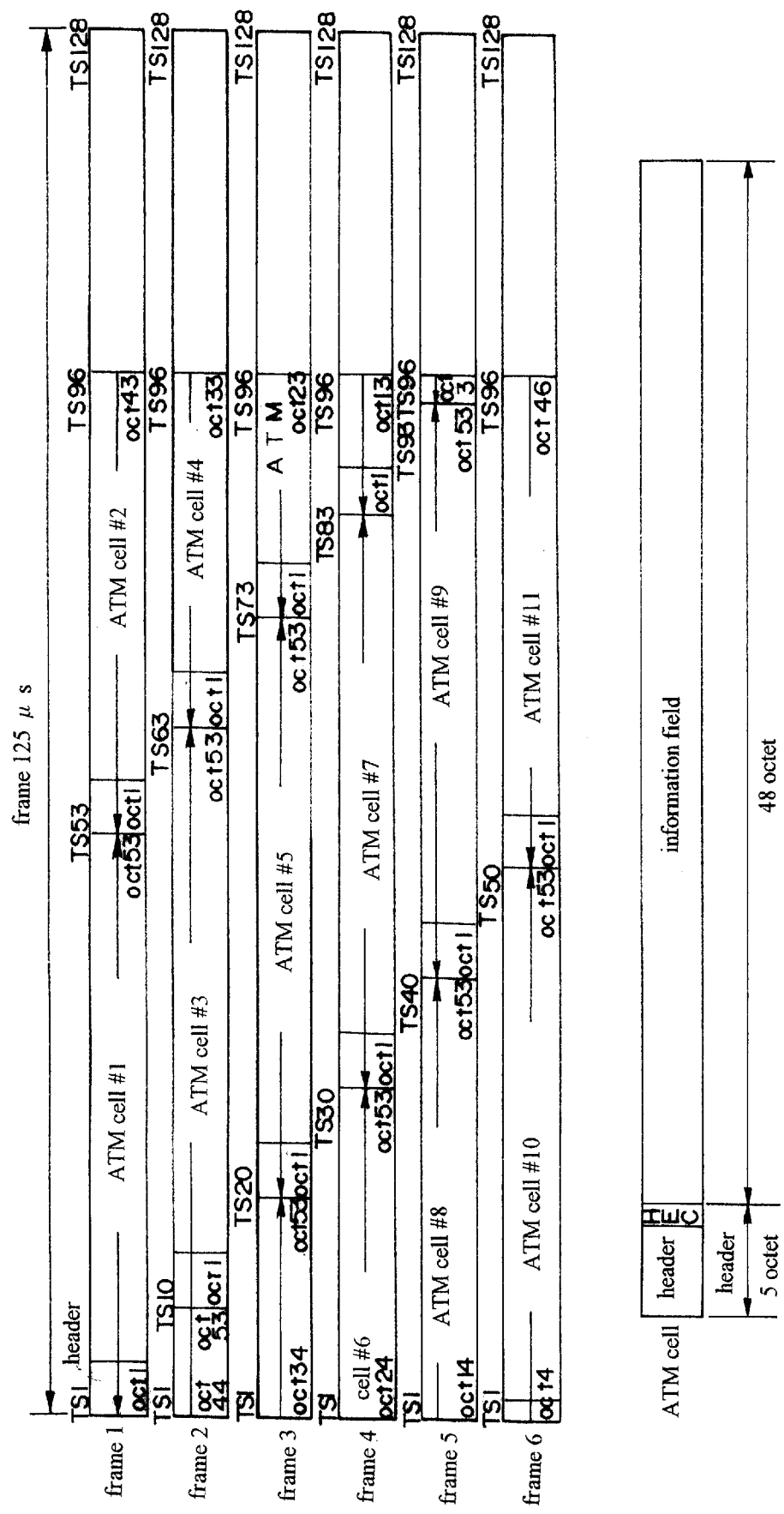
FIG. 7 is a timing view explaining the relation between the frame and the cell data on the 8 Mbps highway.

As is shown in FIG. 7, the 96 octets out of the 123 octets of one frame are used for the transmission of ATM cells. Therefore, in the first frame, the first octet to the fifty-third octet of the first ATM cell #1, and the first octet to the forty-third octet of the second ATM cell #2 are transmitted, and in the second frame, the forty-fourth octet to the fifty-third octet of the second ATM cell #2, and the first octet to the fifty-third octet of the third ATM cell #3, and the first octet to the twenty-third octet of the fourth ATM cell #4 are transmitted. Thereafter, the sequentially inputted ATM cell is divided to each frame, and then transmitted.

For example, when the time slot TS1 comprises of a structural information where VPI=1 and VCI=81, the control circuit 123 takes out the 8 bit data of the time slot TS1 of the data for n frames stored sequentially in the receiving data buffer from the first frame to the forty-eighth frame, and assembles an information field of forty-eight octets, and sends it out to a virtual path "0" and a virtual channel "81".

Further, the control circuit 123 extracts the structural information from the serial data received from the first 8 Mbps highway 16, and forms the VPI and the VCI of the cell header of the ATM cell shown in FIG. 6, and at the same time, forms a cell header by forming the general flow control (GFC), the pay load type (PT), the cell loss priority indication (CLP), and the header error control (HEC) according to the ITU standard, and by assembling said cell header and said information field, completes the assembly of the cell.

When the communication speed is 128 Kbps, a cell information field is assembled from the data of the time slot TS1 and the time slot TS2.

Accordingly, from the communication speed, it depends on the structural information whether the data of which time slot of one frame is used for assembly.

The completed cell is transferred to the transmitting cell buffer 124, and by the parallel/serial (P/S) converting circuit 125 for converting the 8 bit parallel data to the serial data, the 8 bit data is converted to serial data, and according to the signal from the address generating circuit 129, the position of the time slot is sensed, and a cell is sent out to the transmitting data line 127 to the second 8 Mbps highway 17.

Next, the operation of the CLAD unit 12 when disassembling the cell received from the second 8 Mbps is explained.

From the received data line 171 of the second 8 Mbps highway cell 17, utilizing the time slot TS1 to TS96 of the frame received continuously by a 125 μs period, an ATM cell is received continuously from the first frame.

The cell synchronizing circuit 126 detects the head of the cell by a JT-I432 cell synchronizing algorithm from the bit string of the frame, and transfers the cell header signal and the serial data to the serial/parallel converting circuit (S/P) 121B for converting the serial data into an 8 bit parallel data.

The serial/parallel converting circuit (S/P) 121B converts the serial data into an 8 bit parallel data by the detected cell header signal so that it forms an octet string of the cell structure shown in FIG. 6, and transmits the same to the receiving cell buffer 127 as the ATM cell, and writes in the same temporarily.

The control circuit 123 determines which data corresponds to which time slot, based on the VPI and the VCI of the cell header and its structural information of the ATM cell written into the receiving cell buffer 127.

The control circuit 123 writes the 48 octet data of the information field in the ATM cell to the address of the transmitting data buffer 128 corresponding to the time slot by 8 bit data.

The control circuit 123 transfers the data written into the transmitting data buffer 128 to the parallel/serial converting circuit (P/S) 125A sequentially from the first frame time slot TS1 according to the signal from the address generating circuit 129.

The P/S 125A converts the 8 bit data into a serial data, and transfers the same to the transmitting data line 162 to the first 8 Mbps highway 16.

Figure 8:
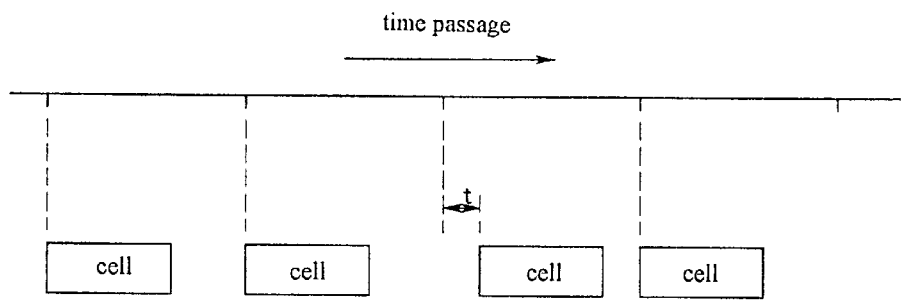
FIG. 8 is a timing view explaining the cell fluctuation.
Figure 9:
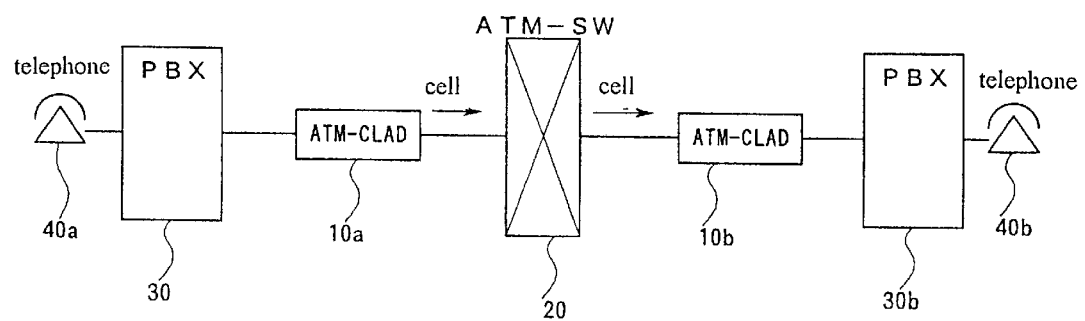
FIG. 9 is a block diagram explaining the concept of the ATM switching network utilizing the ATM-CLAD device.

In an ATM-CLAD device having the above-explained structure, as time passes, the receiving ATM cell received at the receiving data buffer 122 or the receiving data buffer 128 or the receiving cell buffer 127 will show fluctuation shown in FIG. 8 caused by the waiting by the cell collision when a transmitting device such as ATM-SW is inserted therebetween. When an ATM cell is received at a certain interval, it could be regenerated to serial data of a certain communication speed, but when receiving an ATM cell having a part of the ATM cell being delayed, the data corresponding to the delayed time t could not be regenerated to serial data having a certain communication speed, and the continuity of the serial data is lost.

In order to absorb this cell fluctuation, when a trigger of a start of a communication is recognized, the present invention writes dummy data corresponding to time t seconds to the receiver data buffer 122, and then writes in the received data.

Hereinafter, FIG. 5(B) is used to explain the writing of the data to the receiver data buffer 122.

When the first cell for starting the communication is received from the second 8 Mbps highway 17, the present invention determines a send-out address of the data buffer against the first 8 Mbps highway 16 according to the signal of the address generating circuit 129 for transferring data from the transmitting data buffer 128 to the P/S 125A, and data is written into an address which is advanced by "n" frames (n×125 $\mu$s=fluctuation guarantee time)corresponding to time t which is a maximum delay amount of the ATM cell arrival time (fluctuation guarantee time).

That is, when the fluctuation guarantee time is 5 msec, a received first ATM cell data #1 of address R1 is written into the forty-first frame to the ninety-third frame which is advanced by 40 frames worth of time. The second ATM cell #2 is written in from the ninety-fourth frame. Thereafter, the received ATM data will be written in until the number "n" frame similarly.

At this state, even if the second ATM cell #2 arrives with a 2.5 msec delay, the cell data is written into the transmitting data buffer 128 from the ninety-fourth frame continuously.

Upon reading out of the written ATM cell data, the present invention reads out the dummy data DD written into the time slot TS1 from the first frame to the fortieth frame, and then reads out the ATM cell data #1. Therefore, when the ATM cell #2 arrives with a delay, the transferred digital data from the PBX is sent out by a fixed speed, and at the same time, the data guaranteeing the delayed amount will be stored in the transmitting data buffer 128, so that the read-out could be performed normally, and the send out of the ATM cell to the parallel/serial (P/S) 125A will be performed by a fixed speed. Therefore, lack of transmission data will no longer occur, and further, the continuity of the transmitted data will no longer be lost.

As could be understood from the above embodiment, according to the present invention, by detecting the data transfer address of the receiving buffer at the time of receiving the first cell of communication at the receiving buffer in order to secure the data corresponding to the fluctuation guarantee time, and by writing in the data from the address which is advanced by the time corresponding to the fluctuation guarantee time from said detected data transfer address, the occurrence of a buffer under-flow caused by a temporary cell receive delay based on cell fluctuation could be prevented.

Further, since it is possible to set the address of the receiving buffer corresponding to the fluctuation guarantee time regardless of the cell receiving speed, data delay time could be adjusted to a minimal amount.

What is claimed is:

1. A cell fluctuation absorption receiving system, comprising:

a data communication apparatus;

an ATM switching network;

a cell assembly and disassembly device coupling said data communication apparatus and said ATM switching network;

a plurality of input-output interfaces connected to said data communication apparatus;

a data highway connected to one of said input-output interfaces for transfer of cell data in frames, each frame having a fixed number of time slots and having a fixed time length;

a receiving buffer connected to said data highway for storing time slot data for a plurality of frames;

means to store time slot data for a number of frames as dummy data in said receiving buffer before storing first received cell data in said receiving buffer, with said number of frames providing a fluctuation guarantee time; and receiving data storing means for storing said first received cell data in said receiving buffer in an area behind an area in which said dummy data is stored, wherein said cell assembly and disassembly device assembles data made up of a bit string received from said data communication apparatus into cells and disassembles cells received from said ATM switching network into data made up of a bit string each of the assembled and disassembled bit strings having a fixed communication speed.

2. A cell assembly and disassembly device adapted to be coupled between a data communication apparatus and an ATM switching network to assemble data made up of a bit string received from the data communication apparatus into cells and to disassemble cells received from the ATM switching network into data made up of a bit string, each of the assembled and disassembled bit strings having a fixed communication speed, said cell assembly and disassembly device comprising:

a plurality of input-output interfaces adapted to be connected to the data communication apparatus;

a data highway connected to one of said input-output interfaces for transfer of cell data in frames, each frame having a fixed number of time slots and having a fixed time length;

a receiving buffer connected to said data highway for storing the time slot data of a plurality of frames;

means to store time slot data of a number of frames as dummy data in said receiving buffer before storing first received cell data in said receiving buffer, with said number of frames providing a fluctuation guarantee time; and receiving data storing means for storing said first received cell data in said receiving buffer in an area behind an area in which said dummy data is stored, so that the fluctuation reception of the cell is absorbed and the data bit string having a fixed communication speed relative to the connecting device is restored.

* * * * *